Figure 1:
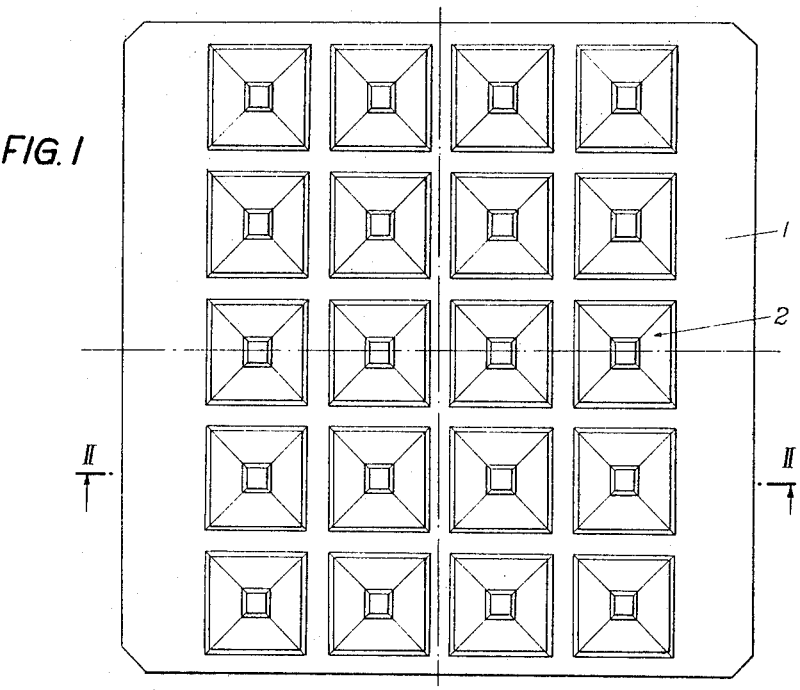

Aug. 9, 1966  Z. HOHNJEC  3,265,281
SHIPPING TRAY
Filed April 14, 1964  6 Sheets-Sheet 1

INVENTOR:
ZELJKO HOHNJEC
BY
ATTORNEY

INVENTOR:
ZELJKO HOHNJEC

Aug. 9, 1966  Z. HOHNJEC  3,265,281
SHIPPING TRAY

Filed April 14, 1964  6 Sheets-Sheet 3

INVENTOR:
ZELJKO HOHNJEC
BY
ATTORNEY

Aug. 9, 1966  Z. HOHNJEC  3,265,281
SHIPPING TRAY

Filed April 14, 1964  6 Sheets-Sheet 5

INVENTOR:
ZELJKO HOHNJEC
BY
ATTORNEY

Aug. 9, 1966  Z. HOHNJEC  3,265,281
SHIPPING TRAY
Filed April 14, 1964  6 Sheets-Sheet 6
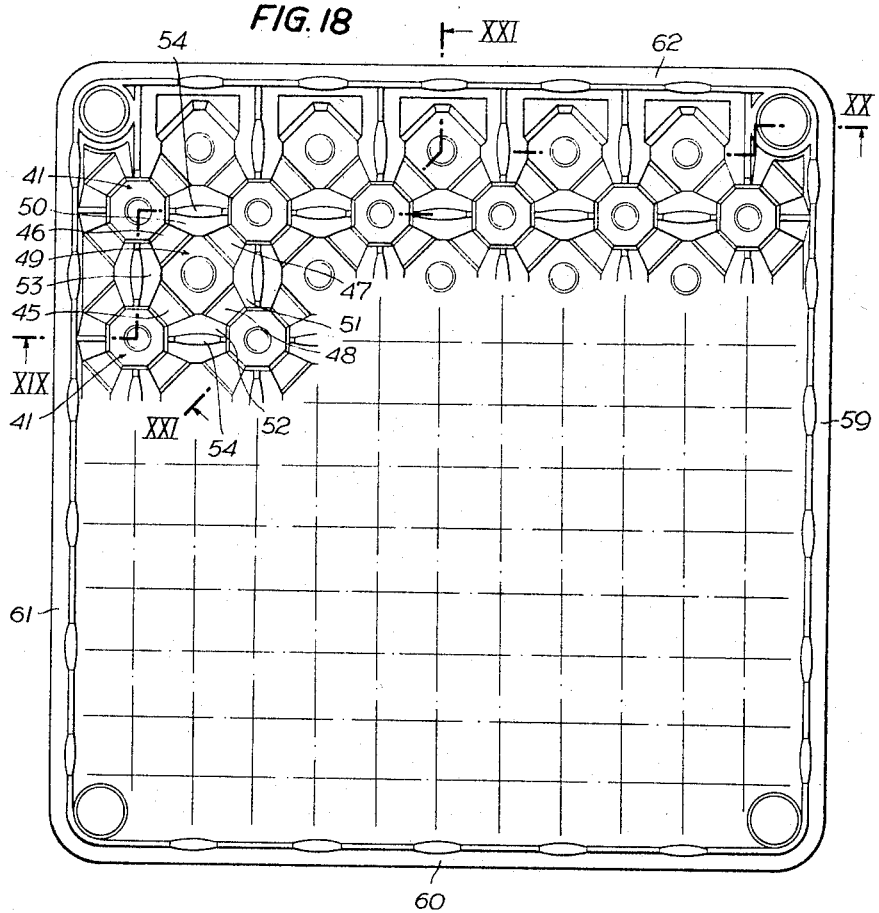
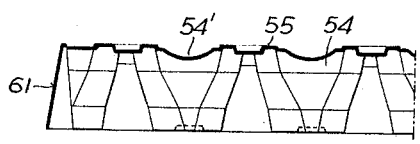
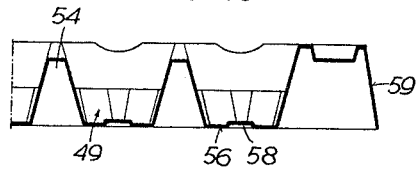
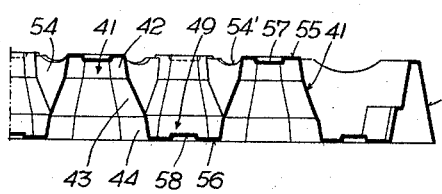
INVENTOR:
ZELJKO HOHNJEC
BY
ATTORNEY United States Patent Office 3,265,281
Patented August 9, 1966

3,265,281
SHIPPING TRAY
Zeljko Hohnjec, 17 Gonzagagasse, Vienna, Austria
Filed Apr. 14, 1964, Ser. No. 359,653
2 Claims. (Cl. 229—2.5)

This invention relates to a shipping tray, which consists particularly of plastics material and comprises receiving depressions regularly disposed at the corners of squares and serves for shipping eggs, fruit, or similar products.

Such shipping trays, and trays of molded woodpulp, are provided with the sensitive products and stacked in cases or boxes, in which they are shipped. Known shipping trays for eggs, also called "egg carriers" are provided with spacing humps bearing on the next upper and lower trays.

It has also been proposed to form egg packages from two mutually facing parts so that a container is formed, which encloses the eggs inserted in its receiving depressions. The closing of such a package, e.g., with clips, rubber rings or the like, however, is not satisfactory.

In connection with such packages, a space-saving packing of the products is most important because this will enable a substantial reduction of the shipping costs, which depend on the shipping space required and have a great effect on the sales price of the product.

Hence, it is an object of the invention to save shipping space and to enable a complete or almost complete sealing of the inserted eggs, fruit or the like from the outside and from each other. If, e.g., an individual egg has been damaged, this broken egg will remain enclosed in its receiving depression and will not adversely affect the eggs disposed in adjacent receiving depressions. Such a sealed package will be extremely hygienic and by the selection of a specific, suitable material for making the shipping trays affords sufficient protection against temperature influences and odors coming from the outside. In the warm season, it may be necessary under certain conditions to provide for a ventilation of the inserted eggs, fruit or the like. This may also be enabled by a specific design of the shipping tray according to the invention.

Based on a shipping tray, particularly from plastics material, with receiving depressions regularly disposed at the corners of squares, which receiving depressions extend only in one direction from a plane, particularly sheetlike baseplate, the essential feature of the invention resides in that each receiving depression has the form of a plurality of, preferably three truncated pyramids merging one into the other and tapering toward the bottom of the receiving depression. In this connection it is of special significance that the included angles of the uppermost and lowermost truncated pyramids defining a receiving depression are equal and the included angle of the intermediate truncated pyramid is larger than the included angle of the two other truncated pyramids.

Due to this design, the inserted eggs bear on the intermediate truncated pyramid of the receiving depression and in a stack of egg-laden shipping trays the upper portion of each egg is held by the outside surfaces of the intermediate truncated pyramids of four receiving depressions, which are disposed in a square and form adjacent humps in the next upper tray, which has been rotated through 90° in its plane.

In a specific further development, the receiving depressions in a square baseplate are symmetrically arranged with respect to the edges and main axes of this plate and to perfectly identical trays, with their baseplates adjacent to each other, are connected by adhering, welding or the like in such a manner that pairs of their receiving depressions enclose single eggs. Such a structure will consist of two connected baseplates, from which hollow humps formed by the receiving depressions extend upwardly and downwardly in a symmetric arrangement. Composite tray pairs of this kind may be inserted into the hump-defined spaces of the next lower or upper tray pair, which has been rotated through 90° in the plane of the baseplates, so that the end faces of the humps and the baseplates bear on each other. According to another feature of the invention, the receiving depressions consist of regular, octagonal, truncated pyramids. In this case the pairs of shipping trays stacked as described can interengage to fill without intervening spaces the case or box in which they are inserted. This advantage results in the desired, considerable saving of shipping space. The width of the octagonal end faces of the smallest truncated pyramid, which is remote from the plane baseplate, is suitably equal to the width of the diagonal area of the baseplate between the receiving depressions.

In order to provide for a desired ventilation of the individual eggs, fruit or the like, particularly when such ventilation is required during the hot season, troughlike depressions may be provided in the baseplate between adjacent receiving depressions and these troughs may form closed connecting ducts between the receiving depressions.

For an improved protection of the inserted products against shock, the shipping tray according to the invention may be designed so that the end face of the depressions or humps is formed with an inwardly directed curved portion, which forms a yielding cushion for the inserted eggs, fruit or the like.

To enable a convenient lifting of a stack of trays according to the invention from the shipping box or case, holes are provided along the edges of the base plates of the shipping trays according to the invention.

Finally, the shipping trays according to the invention may be designed so that the receiving depressions are defined by truncated pyramid-like, hollow humps, which are self-supporting or are strutted against each other by webs and on the outside surfaces of which the inserted products are supported. In this case the shipping tray according to the invention is tublike and the humps are disposed at the bottom of the tub, separated from each other by gaps extending to the bottom, and extend to the height of the sidewalls of the tub.

In a modification, hollow side walls disposed at the edges of the tray contribute substantially to the stiffness of the tray. In this case, webs are provided between the humps and extend throughout the height of the tray.

Such shipping trays may be selectively set with eggs advantageously on both sides.

A plurality of embodiments of the invention will be explained more fully hereinafter with reference to the accompanying drawings.

Figure 2:
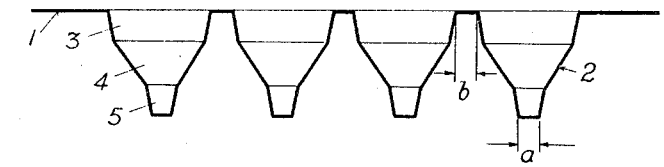
Figure 3:
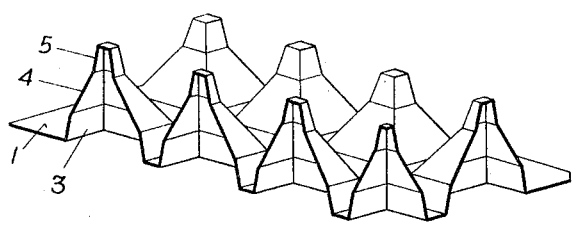
Figure 4:
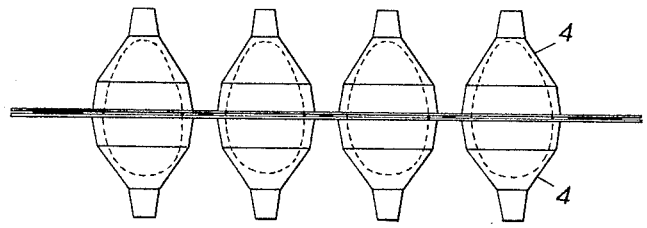
Figure 5:
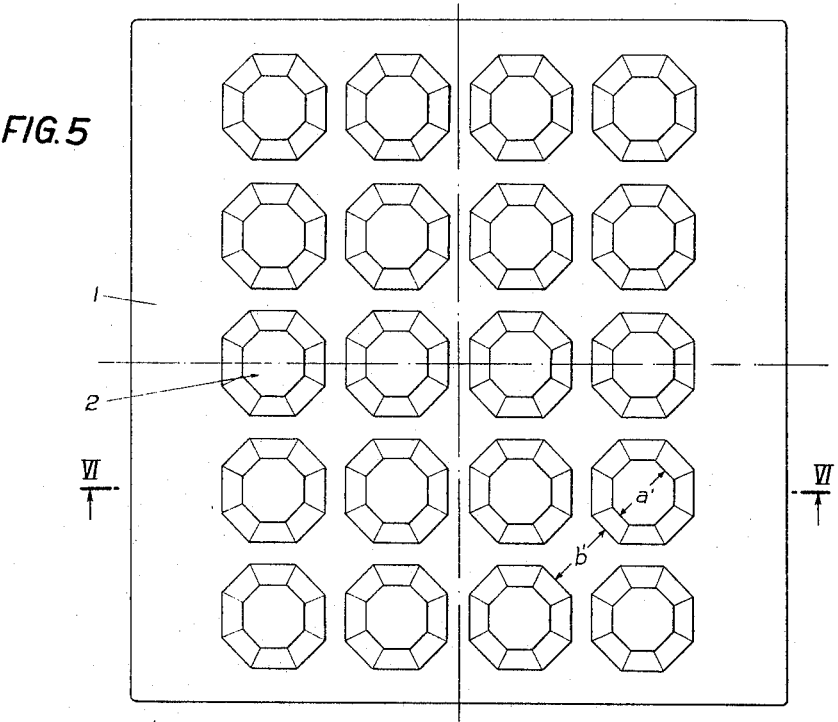
Figure 6:
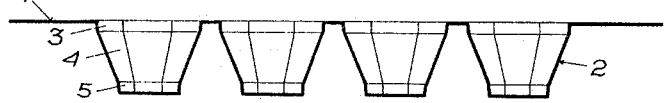
Figure 7:
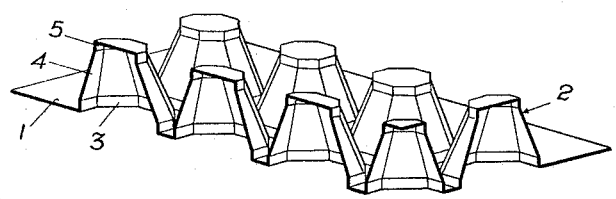
Figure 9:
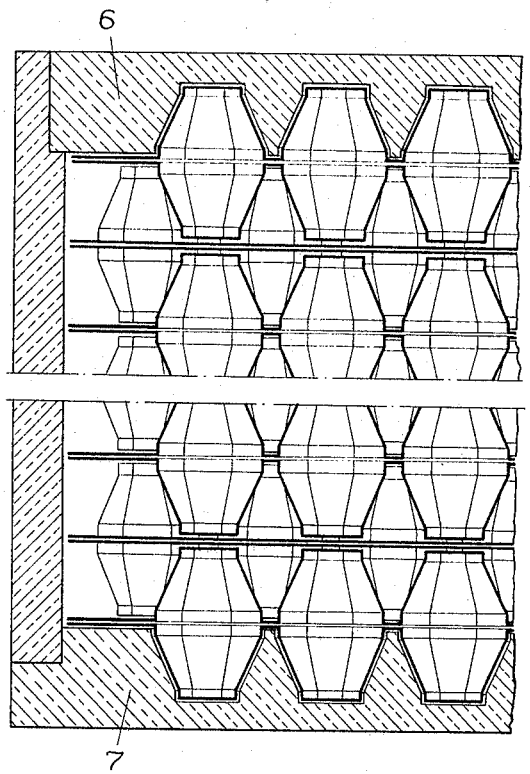
Figure 10:
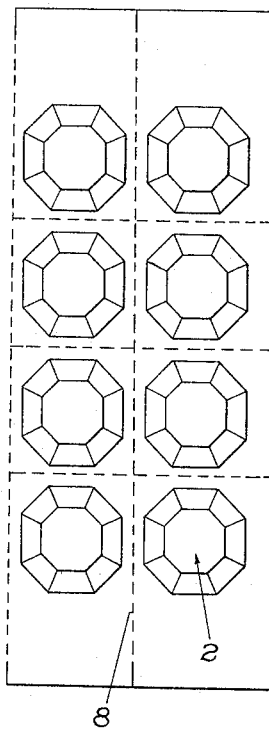
Figure 11:
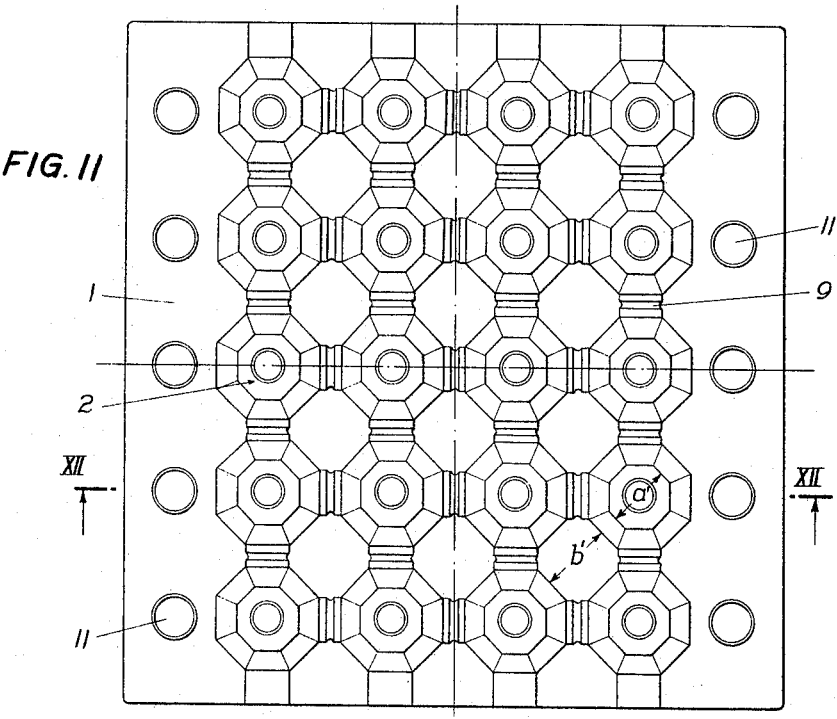
Figure 12:
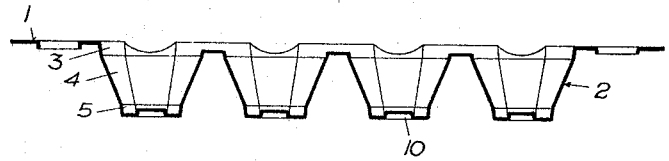
Figure 13:
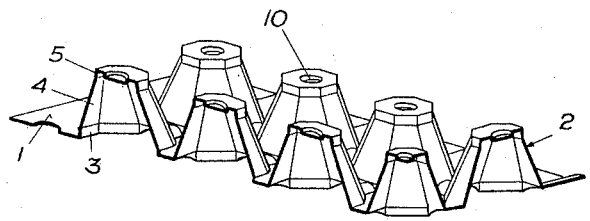
Figure 14:
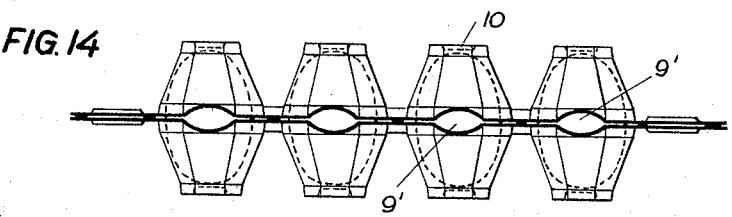
Figure 15:
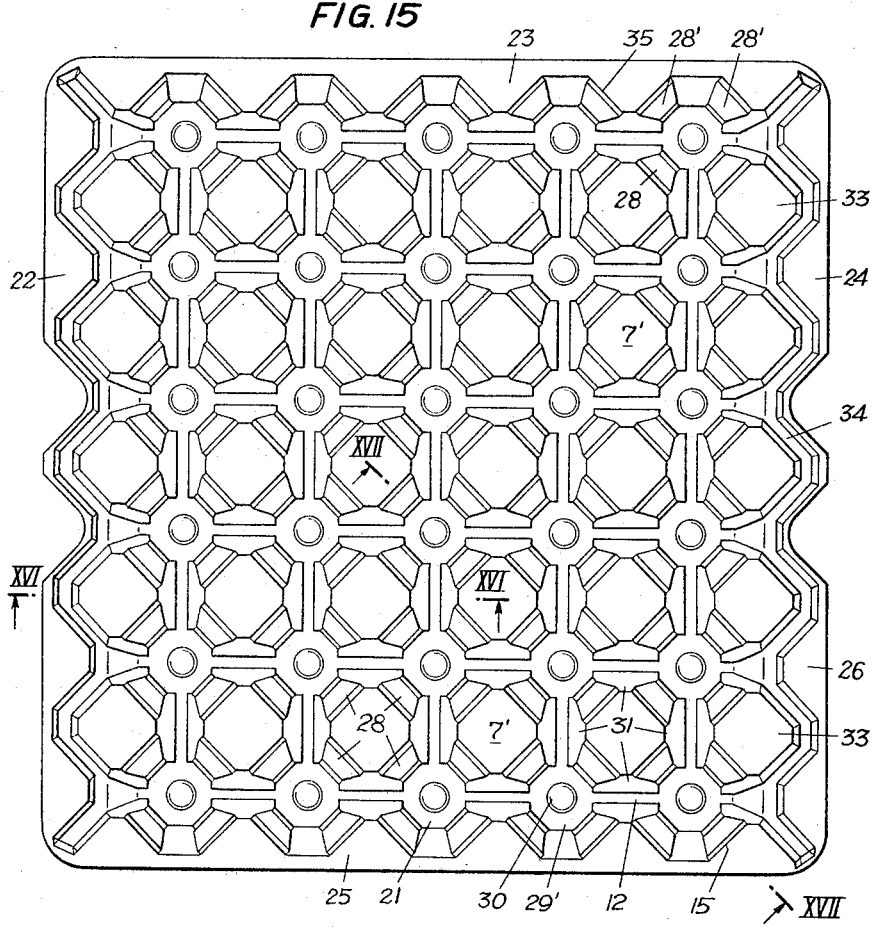
Figure 16:
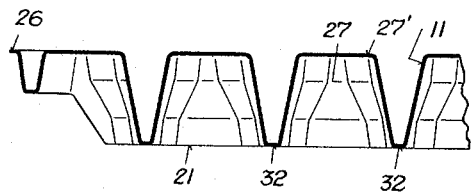
Figure 17:
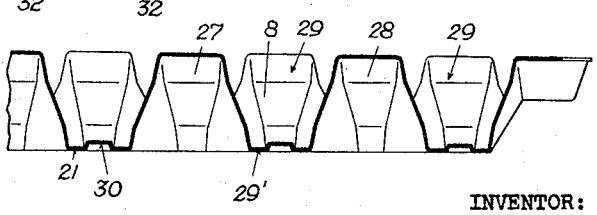

FIG. 1 is a top plan view showing a first embodiment of the shipping tray according to the invention. FIG. 2 is a sectional view taken on line II—II of FIG. 1. FIG. 3 is a perspective view, partly in section, showing an inverted shipping tray. FIG. 4 illustrates two shipping trays, which are welded together with their baseplates adjacent to each other. FIGS. 5 to 8 are views similar to FIGS. 1 to 4 and illustrate a second embodiment of the shipping tray according to the invention. FIG. 9 is a sectional view showing a case, in which a plurality of pairs of trays are inserted, the cover and bottom of the box being formed like trays according to the invention. FIG. 10 shows a shipping tray which is provided with perforations. FIGS. 11 to 14 show a third embodiment of the shipping tray according to the invention in views similar to FIGS. 1 to 4 or 5 to 8. FIG. 12 is a sectional view taken on line XII—XII of FIG. 11. FIGS. 15 to 17 show a fourth embodiment. FIG. 16 is a sectional view taken on line XVI—XVI and FIG. 17 a sectional view taken on line XVII—XVII of FIG. 15. Finally, FIGS. 18 to 21 show a fifth embodiment. FIGS. 19 to 21 are sectional views taken on lines XIX—XIX, XX—XX, and XXI—XXI, respectively, of FIG. 18.

With reference to FIG. 1, the shipping tray according to the invention comprises a plane baseplate 1, e.g., of deep-drawable polystyrene. As is apparent, receiving depressions 2 are provided in a perfectly symmetric arrangement with respect to the main axes of this baseplate, which are shown on the drawing. These depressions are perfectly regular and adapted to receive the products to be shipped, such as eggs. When this shipping tray is viewed from the underside, the receiving depressions appear as hollow humps, which protrude from the baseplate 1 (FIG. 3).

For the sake of simplicity, only four rows having each five receiving depressions are shown in the present embodiment. In practice, five rows each having six receiving depressions are provided in most cases so that the most widely used shipping tray can receive thirty eggs.

It is apparent from FIG. 2 that each receiving depression 2 consists of two truncated pyramids 3, 4, and 5, which merge one into the other and have a square cross-sectional configuration. The included angles of the uppermost truncated pyramid 3 and of the lowermost, smallest truncated pyramid 5 are equal, and the included angle of the intermediate truncated pyramid 4 is larger than that of the two other truncated pyramids. The spaces between the rows of humps formed by the receiving depressions in both directions at right angles to each other have the same cross-section as a receiving depression inverted through 180°. Particularly, the width $a$ of the bottom of the truncated pyramid 5 remote from the baseplate is equal to the width of the space $b$ between the parallel rows of humps.

If pairs of shipping trays are so arranged that their baseplates 1 face each other and are connected by adhering, welding or the like (FIG. 4), and these pairs are superimposed so that adjacent pairs are staggered relative to each other by 90°, the rows of humps of one pair will be disposed between the rows of humps of the next upper or lower pair in such a manner that the edges of the square baseplate 1 are vertically aligned. A stack of pairs of shipping trays thus disposed may easily be inserted in a case, such as is apparent in connection with another embodiment from FIG. 9. In this case, the cover 6 and the bottom 7 are also provided with receiving depressions, which are capable of receiving one pair of trays to the extent of one half of its height. It is apparent from the drawing that the space enclosed by such a case is virtually completely utilized.

Perforations 8 (FIG. 10) or lines of weakness may be provided along the rows of receiving depressions to facilitate the separation of individual parts of the shipping tray. If the package consists of two shipping trays facing each other, each of such parts may enclose only a single egg on all sides.

It is apparent that a single egg which has been damaged will remain in smashed condition in its receiving depression but will not adversely affect the eggs which are disposed in adjacent depressions. Hence, the package is most hygienic. The eggs are protected from temperature influences and foreign odors not only by the material of the trays but also by being airtightly enclosed on all sides, as is shown in FIG. 4.

In the embodiment shown in FIGS. 5 to 8, each receiving depression or hump has the form of a regular octagon in cross-section. In practice, this cross-sectional shape has proved superior to a rectangular shape because the individual egg is enclosed more evenly on all sides and because an even more complete utilization of the spaces between the rows of depressions is enabled. Just as in the example of FIGS. 1 to 4, each receiving depression consists of three truncated pyramids 3, 4, 5, which merge one into the other but, as has been mentioned, have an octagonal shape in cross-section.

The spaces between the rows of humps extending diagonally with respect to the center line of the tray correspond in cross-section in the directions at right angles to each other to the cross-section of a single receiving depression. The width $a'$ of the end face of the smallest truncated pyramid 5 corresponds to the diagonal spacing $b'$ of two depressions measured in the plane of the baseplate 1.

The complete utilization of the intervening spaces results in a particularly good utilization of the shipping space which is available. The invention enables, e.g., an accommodation of 540 eggs in cases having internationally standardized dimensions for 360 eggs, provided that each shipping tray has five rows of six depressions in a baseplate of 310 mm.×310 mm.

Figure 8:
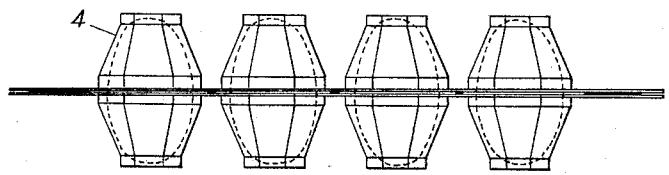

As is shown in FIG. 8, the trays may be connected to each other (by stapling, adhering or welding) in pairs as in FIG. 4 with their baseplates facing each other, and these pairs may be stacked with adjacent pairs being staggered by 90° so that the rows of humps of one pair are disposed between the rows of the adjacent upper or lower pairs and the edges of the square baseplates are vertically aligned.

In the warm season, it may be necessary under certain circumstances to provide for a ventilation of the eggs inserted in the depressions. To this end, troughlike depressions may be provided in the baseplates between adjacent receiving depressions to form closed connecting ducts between the receiving depressions when two shipping trays are superimposed and their baesplates are adhered to each other.

In the embodiment shown in FIGS. 11 to 14, the troughlike depressions are designated with the numeral 9. Two superimposed trays will form closed connecting ducts 9' between the individual receiving depressions 2.

It may also be suitable to increase the inherent insensitivity of the package to shock. To this end, the end face of the smallest truncated pyramid 5 may have a portion 10 which protrudes into the interior of the receiving depression. These protruding portions form a yieldable cushion for the inserted eggs (FIG. 14). This is of special importance when a plurality of shipping trays are superimposed.

Finally, it is desirable to provide a row of holes 11 along each of the edges of the baseplate to facilitate the removal of the shipping trays from the cases, which are in most cases closely spaced around the trays.

In a fourth embodiment, which is shown in FIGS. 15 to 17, the receiving depressions are formed by truncated pyramidlike, self-supporting, hollow humps, on whose outside surfaces the product units are supported. The shipping tray is tublike, and the humps are provided at the bottom of the tub, are separated by gaps extending to the bottom, and extend to the height of the side walls of the tub. This embodiment constitutes a particularly stiff carrier, which may also be used after inversion through 180° with the hollow humps forming receiving depressions.

The shipping tary according to this embodiment comprises a tub, which has a bottom 21 and side walls 22 to 25, which extend outwardly and upwardly to the edge portions 26. The preferred embodiment has a height of only 35 mm. Four rows each having five self-supporting humps 27 are provided in a regular arrangement at the bottom of the tub in groups of four humps disposed at the corners of a square. The humps 27 are upwardly tapered like truncated pyramids and consist as in the examples of FIGS. 1 to 14 of superimposed truncated pyramids merging one into the other. The humps have a square end face 27', which lies in one plate with the edge portions 26 of the walls. The outside surfaces of each hump consist of eight surfaces, which are mutually oppositely disposed in pairs. Four of these surfaces form the supporting surfaces 28 of depressions 29. The self-supporting humps 27 define twelve of such depressions.

The bottom surfaces 29' of the depressions lie in the bottom of the tub and are octagonal. Each of these bottom surfaces has at its center a circular re-entrant portion 30, which is adapted to support the small end of an egg.

In addition to the four supporting surfaces 28 which are mutually oppositely disposed in pairs, the humps have four additional, free surfaces 31, which are triangular and also mutually oppositely disposed in pairs. Each of these free surfaces 31 is connected to the opposite surface 31 of the adjacent hump by a small web 32 in the bottom plane of the tray. As these webs lie in the bottom plane, each of the inserted eggs can easily be gripped from the side for removal from the tray. In addition to the twenty self-supporting humps, five incomplete humps 33 are provided at two opposite side walls 22, 24 of the tub and merge into the respective side wall so that troughs 34 are defined. These humps 33 and the adjacent row of self-supporting humps define receiving depressions for eggs just as the self-supporting humps 24. The trough 34 enables a holding also of those eggs which are disposed at the edge of a lower tray. The side walls 23, 25 are disposed at the edge of a lower tray. The side walls 23, 25 are formed with inwardly directed indentations 35, which form supporting surfaces 28' opposite to the supporting surfaces 28 of the self-supporting humps 27. The side walls 23, 25 and the incomplete humps 33 merging into the side walls 22, 24 form in the first place eighteen further receiving depressions so that this shipping tray can accommodate thirty eggs, just as the shipping tray according to FIGS. 5 to 11. The number of depressions and, consequently, the capacity of the trays according to the invention may be increased in one direction or the other.

The shipping tray for eggs shown in FIGS. 18 to 21 comprises humps 41, which are disposed at the corners of regularly distributed squares and which consist of three superimposed truncated pyramids 42, 43, 44 merging one into the other, just as in the embodiments described hereinbefore. These truncated pyramids are also octagonal in top plan and have four diagonally opposite side faces 45, 46, 47, 48, which define receiving depressions 49. These receiving depressions are also defined by the side faces 50, 51, 52, 53 of hollow webs 54, each of which connects four humps 41 disposed at a square. The top end face 55 of each hump 41 and the bottom 56 of each receiving depression 49 are provided with a circular re-entrant portion 57 or 58. Each of these shipping trays has five rows, each of which comprises six humps 41 or depressions 49 so that thirty eggs can be carried by each shipping tray. The eggs inserted into the depressions 49 bear on the outer side faces 45–48 of the humps 41 and on the side faces 50–53 of the webs 54 which connect the humps. If a tray set with eggs has placed upon it a tray which has been rotated through 90° in its main plane, the bottom 56 of each depression 49 will be supported by the top end faces 55 of a hump 41 and each egg will be enclosed in the cavity of a hump of the corresponding upper tray and can bear on the inside surfaces of the hollow humps. The circular re-entrant portion 57 or 58 at the top end face 55 of the humps and at the bottom face 56 of each depression provide a resilient support for the inserted eggs.

At its edges, each tray has hollow side walls 59, 60, 61, 62, which are formed with outside surfaces which extend outwardly and downwardly. The outside surfaces of these walls are connected to each other at the corners of the square tray by a common curved portion. Hence, each tray comprises a square structure, which is surrounded by four side walls and is formed with a number of regularly disposed humps or receiving depressions, which are connected to each other and are strutted against each other by hollow webs. Hollow webs serve also for supporting the humps against the hollow side walls 59 to 62.

The hollow webs 54 which connect the humps 41 to each other have a concave narrow top face 54' so that the inserted eggs may be conveniently removed from the receiving depressions with the fingers.

The provision of the hollow side walls 59 to 62 enables the insertion of thirty eggs also into this tray, regardless of whether it is used in the position shown in FIGS. 19 to 21 or upside down. The hollow webs and the hollow side walls impart an extremely high stiffness to the tray.

What is claimed is:

1. Transportable package for supporting a number of fragile articles in predetermined, fixed position, comprising two tablets, each consisting of a plane base foil extending into a sheeted structure consisting of a number of substantially equal positioning troughs, each forming over a square base a cavity shaped to receive one of said articles within its concave portion; said cavities being substantially closed except at their bases and being arranged at regular distances at the corner points of said square bases; said square bases being arranged substantially in the plane of said base foil, leaving on said base foil at least two oppositely arranged edge strips, said troughs becoming smaller with increasing depth and forming three pyramid frustums, one on top of the other, whereby the inclination of the walls of each trough at the highest and lowest frustum are substantially equal and steeper than that of the wall of the intermediate frustum, said troughs extending from said base foil substantially in one direction only and the walls of adjoining troughs being separated from each other; and means for attaching said tablets to each other, including the outer ledges formed at the bases of the outer rows of said pyramid frustums and extending outwardly sufficiently so as to form said edge strips and to permit attachment of said tablets to each other on said edge strips, each trough of one tablet facing the trough of the other tablet, thereby forming a substantially closed structure encasing the fragile articles positioned in said troughs.

2. Structure according to claim 1, whereby there are arranged between the troughs wall indentations permitting at least one portion of said troughs to be separated from another.

References Cited by the Examiner

UNITED STATES PATENTS

| | | | |
|---|---|---|---|
| 2,023,783 | 12/1935 | Edgerton | 217—26.5 |
| 2,233,044 | 2/1941 | Beck | 217—26.5 |
| 2,691,456 | 10/1954 | Shepard | 217—26.5 |
| 2,838,173 | 6/1958 | Emery | 229—2.5 X |
| 2,934,233 | 4/1960 | Schwartzberg | 217—26.5 |
| 3,056,523 | 10/1962 | Reifers | 229—2.5 X |
| 3,100,055 | 8/1963 | Martelli et al. | 217—26.5 |

JOSEPH R. LECLAIR, *Primary Examiner.*

D. T. MOORHEAD, *Assistant Examiner.*